(12) United States Patent
Nachlieli et al.

(10) Patent No.: US 8,873,104 B2
(45) Date of Patent: Oct. 28, 2014

(54) COLOR PRINTING SYSTEM CALIBRATION

(75) Inventors: Hila Nachlieli, Haifa (IL); Michal Aharon, Haifa (IL); Doron Shaked, Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 13/639,050

(22) PCT Filed: Apr. 7, 2010

(86) PCT No.: PCT/US2010/030240
§ 371 (c)(1),
(2), (4) Date: Oct. 2, 2012

(87) PCT Pub. No.: WO2011/126480
PCT Pub. Date: Oct. 13, 2011

(65) Prior Publication Data
US 2013/0021631 A1 Jan. 24, 2013

(51) Int. Cl.
*H04N 1/40* (2006.01)
*H04N 1/60* (2006.01)

(52) U.S. Cl.
CPC .................................. *H04N 1/6047* (2013.01)
USPC .............................. 358/2.1; 358/504; 358/406

(58) Field of Classification Search
CPC .............. H04N 1/6033; H04N 1/4078; H04N 1/00015; H04N 1/00031; H04N 1/00045; H04N 1/00087; H04N 1/00002; H04N 1/00023; G06K 15/027; G06K 15/02; G06K 15/129; G06K 2215/0094; B41J 29/393; B41J 11/0095; B41J 2/195; G01J 3/50; G01J 3/501; G01J 3/524; B41F 33/0036; G03G 15/5062; G03G 2215/0161
USPC .......... 358/1.9, 2.1, 500, 504, 518, 1.18, 400, 358/406; 347/19
See application file for complete search history.

(56) References Cited

U.S. PATENT DOCUMENTS

| 5,508,826 | A | * | 4/1996 | Lloyd et al. | .................... 358/501 |
| 7,843,601 | B2 | * | 11/2010 | Yamada | .................... 358/1.9 |
| 2002/0180998 | A1 | | 12/2002 | Wu | |
| 2005/0093923 | A1 | | 5/2005 | Busch et al. | |
| 2008/0063413 | A1 | | 3/2008 | Zuber | |

OTHER PUBLICATIONS

International Search Report and Written Opinion for PCT Application No. PCT/US2010/030240. Korean Intellectual Property Office, Dec. 21, 2010.

* cited by examiner

*Primary Examiner* — Thomas D Lee
*Assistant Examiner* — Stephen M Brinich

(57) ABSTRACT

A component of a color printing system, such as lookup tables for converting requested marking-agent coverages to corresponding half-tone screen sizes, is calibrated. The calibration can be effected off an arbitrary image and involves making reflectance spectrum measures of the printed image at multiple locations. Expected reflectance measures for each measurement location are computed based on the requested coverage value for each of the marking agents printed there. The computed measures may be dependent on a parameter. A value of the parameter is determined that minimizes the aggregate differences between the sensed and expected reflectance-spectrum measures, and this value is then used in calibrating the component.

16 Claims, 5 Drawing Sheets

$$\text{Element } a_{i\text{-}d} \text{ in } A_i = \prod_{\text{ink} \in \{c,m,y,k\}} \begin{cases} c_{i\text{-ink}} & \text{ink} \in d \\ (1 - c_{i\text{-ink}}) & \text{ink} \notin d \end{cases} \implies A_i = B \, x_i \quad \text{where:}$$

$A_i$: column vector of coverages $a_{i\text{-}d}$ $B$: 16 x 16 Matrix $x_i$: "actual coverage products" column vector for $i^{th}$ location:

$$\begin{bmatrix} a_{i\text{-}\emptyset} \\ a_{i\text{-c}} \\ a_{i\text{-m}} \\ a_{i\text{-y}} \\ a_{i\text{-k}} \\ a_{i\text{-cm}} \\ a_{i\text{-cy}} \\ a_{i\text{-ck}} \\ a_{i\text{-my}} \\ a_{i\text{-mk}} \\ a_{i\text{-yk}} \\ a_{i\text{-cmy}} \\ a_{i\text{-cmk}} \\ a_{i\text{-cyk}} \\ a_{i\text{-myk}} \\ a_{i\text{-cmyk}} \end{bmatrix} = \begin{bmatrix} 1 & -1 & -1 & -1 & -1 & 1 & 1 & 1 & 1 & 1 & 1 & -1 & -1 & -1 & -1 & 1 \\ 0 & 1 & 0 & 0 & 0 & -1 & -1 & -1 & 0 & 0 & 0 & 1 & 1 & 1 & 0 & -1 \\ 0 & 0 & 1 & 0 & 0 & -1 & 0 & 0 & -1 & -1 & 0 & 1 & 0 & 1 & 1 & -1 \\ 0 & 0 & 0 & 1 & 0 & 0 & -1 & 0 & -1 & 0 & -1 & 1 & 1 & 0 & 1 & -1 \\ 0 & 0 & 0 & 0 & 1 & 0 & 0 & -1 & 0 & -1 & -1 & 0 & 1 & 1 & 1 & -1 \\ 0 & 0 & 0 & 0 & 0 & 1 & 0 & 0 & 0 & 0 & 0 & -1 & 0 & -1 & 0 & 1 \\ 0 & 0 & 0 & 0 & 0 & 0 & 1 & 0 & 0 & 0 & 0 & -1 & -1 & 0 & 0 & 1 \\ 0 & 0 & 0 & 0 & 0 & 0 & 0 & 1 & 0 & 0 & 0 & 0 & -1 & -1 & 0 & 1 \\ 0 & 0 & 0 & 0 & 0 & 0 & 0 & 0 & 1 & 0 & 0 & -1 & 0 & 0 & -1 & 1 \\ 0 & 0 & 0 & 0 & 0 & 0 & 0 & 0 & 0 & 1 & 0 & 0 & 0 & -1 & -1 & 1 \\ 0 & 0 & 0 & 0 & 0 & 0 & 0 & 0 & 0 & 0 & 1 & 0 & -1 & 0 & -1 & 1 \\ 0 & 0 & 0 & 0 & 0 & 0 & 0 & 0 & 0 & 0 & 0 & 1 & 0 & 0 & 0 & -1 \\ 0 & 0 & 0 & 0 & 0 & 0 & 0 & 0 & 0 & 0 & 0 & 0 & 1 & 0 & 0 & -1 \\ 0 & 0 & 0 & 0 & 0 & 0 & 0 & 0 & 0 & 0 & 0 & 0 & 0 & 1 & 0 & -1 \\ 0 & 0 & 0 & 0 & 0 & 0 & 0 & 0 & 0 & 0 & 0 & 0 & 0 & 0 & 1 & -1 \\ 0 & 0 & 0 & 0 & 0 & 0 & 0 & 0 & 0 & 0 & 0 & 0 & 0 & 0 & 0 & 1 \end{bmatrix} \times \begin{bmatrix} 1 \\ c_{i\text{-c}} \\ c_{i\text{-m}} \\ c_{i\text{-y}} \\ c_{i\text{-k}} \\ c_{i\text{-c}}c_{i\text{-m}} \\ c_{i\text{-c}}c_{i\text{-y}} \\ c_{i\text{-c}}c_{i\text{-k}} \\ c_{i\text{-m}}c_{i\text{-y}} \\ c_{i\text{-m}}c_{i\text{-k}} \\ c_{i\text{-y}}c_{i\text{-k}} \\ c_{i\text{-c}}c_{i\text{-m}}c_{i\text{-y}} \\ c_{i\text{-c}}c_{i\text{-m}}c_{i\text{-k}} \\ c_{i\text{-c}}c_{i\text{-y}}c_{i\text{-k}} \\ c_{i\text{-m}}c_{i\text{-y}}c_{i\text{-k}} \\ c_{i\text{-c}}c_{i\text{-m}}c_{i\text{-y}}c_{i\text{-k}} \end{bmatrix}$$

Figure 4

For Quadratic Coverage Conversion Functions:

$$x_i' = V_i \times Q$$

"expected coverage products" column vector for $i^{th}$ location

"parameter products" column vector $$\begin{bmatrix} 1 \\ e_{i\text{-}c} \\ e_{i\text{-}m} \\ e_{i\text{-}y} \\ e_{i\text{-}k} \\ e_{i\text{-}c}e_{i\text{-}m} \\ e_{i\text{-}c}e_{i\text{-}y} \\ e_{i\text{-}c}e_{i\text{-}k} \\ e_{i\text{-}m}e_{i\text{-}y} \\ e_{i\text{-}m}e_{i\text{-}k} \\ e_{i\text{-}y}e_{i\text{-}k} \\ e_{i\text{-}c}e_{i\text{-}m}e_{i\text{-}y} \\ e_{i\text{-}c}e_{i\text{-}m}e_{i\text{-}k} \\ e_{i\text{-}c}e_{i\text{-}y}e_{i\text{-}k} \\ e_{i\text{-}m}e_{i\text{-}y}e_{i\text{-}k} \\ e_{i\text{-}c}e_{i\text{-}m}e_{i\text{-}y}e_{i\text{-}k} \end{bmatrix} = \begin{bmatrix} 16 \times 16 \\ \text{Matrix} \\ \text{of values related to} \\ \text{irequested ink coverages } \alpha_{i\text{-ink}} \\ \text{for } i^{th} \text{ location} \end{bmatrix} \begin{bmatrix} 1 \\ q_c \\ q_m \\ q_y \\ q_k \\ q_c q_m \\ q_c q_y \\ q_c q_k \\ q_m q_y \\ q_m q_k \\ q_y q_k \\ q_c q_m q_y \\ q_c q_m q_k \\ q_c q_y q_k \\ q_m q_y q_k \\ q_c q_m q_y q_k \end{bmatrix}$$

Fourteenth row $\alpha_c\alpha_y\alpha_k(1-\alpha_m)$  $\alpha_y\alpha_k(\alpha_m\text{-}1)\beta_c$  $\alpha_c\alpha_y\alpha_k\beta_m$  $\alpha_c\alpha_k(\alpha_m\text{-}1)\beta_y$  $\alpha_c\alpha_y(\alpha_m\text{-}1)\beta_k$  $\alpha_y\alpha_k\beta_c\beta_k$ $\alpha_k(1-\alpha_m)\beta_c\beta_y$  $\alpha_y(1-\alpha_m)\beta_c\beta_k$  $\alpha_c\alpha_k\beta_m\beta_y$  $\alpha_c\alpha_y\beta_m\beta_k$  $\alpha_c(1-\alpha_m)\beta_y\beta_k$  $\alpha_k\beta_c\beta_m\beta_y$ $\alpha_y\beta_c\beta_m\beta_k$  $(\alpha_m\text{-}1)\beta_c\beta_y\beta_k$  $\alpha_c\beta_m\beta_y\beta_k$  $-\beta_c\beta_m\beta_y\beta_k$

Figure 5

COLOR PRINTING SYSTEM CALIBRATION

CLAIM FOR PRIORITY

The present application is a national stage filing under 35 U.S.C 371 of PCT application number PCT/US2010/030240, having an international filing date of Apr. 7, 2010, which is incorporated by reference in its entirety.

BACKGROUND

Color consistency is of major importance in commercial printing, and much effort is put into producing and preserving the exact colors defined by the customer for a print job.

Digital halftone color printing systems use a small number of differently colored marking agents—a typical printing system may, for example, use four inks (cyan, yellow, magenta and black). For each ink, a respective Look Up Table (LUT) is provided to map a requested ink coverage, derived from input image data, to the digital screen that should be used on the print according to the current printed state.

In order to enable accurate color reproduction, the LUT for each ink is calibrated by a process that involves using only that ink to print, for example, fifteen patches each using a respective one of the following percentage digital screens: 2, 4, 6, 9, 12, 14, 16, 18, 23, 27, 33, 40, 50, 65 and 80, and then measuring the resulting actual ink coverage printed in respect of each screen. This enables a screen-size/coverage mapping to be generated and the thick line 10 in FIG. 1 of the accompanying drawings illustrates a typical mapping curve 10 derived in this way. The reasons for the non-linearity of the curve 10 include ink and printing-system properties such as dot gain and dot loss. The mapping generated for each ink is stored in the corresponding LUT.

Following the calibration process, whenever it is desired to print a particular coverage t of one of the inks, the corresponding LUT is used to map the requested coverage to the digital screen r that needs to be sent to print in order to have coverage t printed.

However, with time, the printing system state starts to change (drift) throwing out the mappings held by the LUT—that is, printing with a specific digital screen results in different coverage from the one indicated by the LUT mapping. This gives rise to prints that are inconsistent with earlier prints of the same input image data and this can be particularly significant over long print runs. In order to preserve consistency, the print run has to be interrupted and the LUTs re-calibrated. Since printing the calibration job requires time and additional 4-13 pages, print costs are increased; in addition, print workflow is interrupted.

In order to save time and consumables, shorter color calibration processes have been introduced based on the approximation that the color drifts in the printing system are small and that the required LUT correction can be modelled by some function. These approximations enable the LUTs to be updated to take account of drift based on measurements of only a few single-ink patches for each ink.

A number of proposals have previously been made to calibrate (including re-calibrate) the LUTs by making measurements of the customer job being printed; one such proposal is described in WO-A-2008/030522 (Hewlett-Packard Development Company). There are a number of difficulties involved in using the customer print job for LUT calibration, notable among which is that there will generally be few, if any, areas printed with only a single ink.

SUMMARY OF THE INVENTION

According to the present invention, there is provided a method and apparatus for evaluating repeating band artefact severity as set out in accompanying claims.

BRIEF DESCRIPTION OF THE DRAWINGS

Embodiments of the invention will now be described, by way of non-limiting example, with reference to the accompanying diagrammatic drawings, in which:

FIG. 4 depicts, in matrix form, derivation of primary coverages in a Neugebauer print model from combinations of actual printed ink coverages;

FIG. 5 depicts the derivation of expected ink coverages on the basis of requested coverages and parameters of parameterized drift-accommodating coverage conversion functions.

DETAILED DESCRIPTION

The embodiments of the present invention described below provide methods for calibrating, for each ink of a color printing system, the stored relationship (typically, but not limited to, a LUT-based implementation) used for converting requested ink coverages into corresponding machine settings (such as half-tone screen sizes) intended to result in corresponding actual ink coverages in a printed image. The calibration methods to be described use arbitrary printed images, such as customer print jobs, rather than requiring calibration specific printed images such as sets of single-ink patches. Herein, the term "calibration" as used in relation to a printing-system component is to be understood in a general sense as the setting or adjusting of some element or value associated with the component (for example, LUT calibration means adjusting the values stored in the LUT).

The calibration methods will be described as implemented in an example color printing system, it being understood that the calibration methods can be generally applied to any such system and are not limited by the specifics of the example system described below.

Although the calibration methods will be described in the context of the continuous calibration of a color printing system in the course of a print run of a customer job and using in-line optical sensors (such as densitometers or scanners), the calibration methods can also be used outside a print run on the basis of previously printed images.

The calibrations methods can also be adapted to the calibration of other printing-system components beyond the coverage conversion LUTs.

Figure 1:
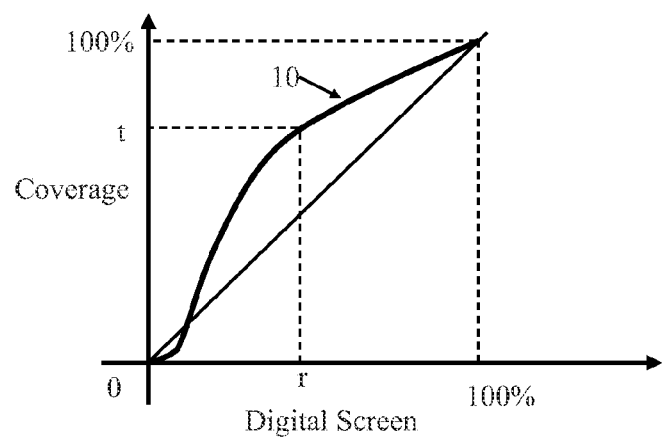
FIG. 1 is a diagram illustrating a mapping between ink coverage and half-tone screen size in a known color printing system.
Figure 2:
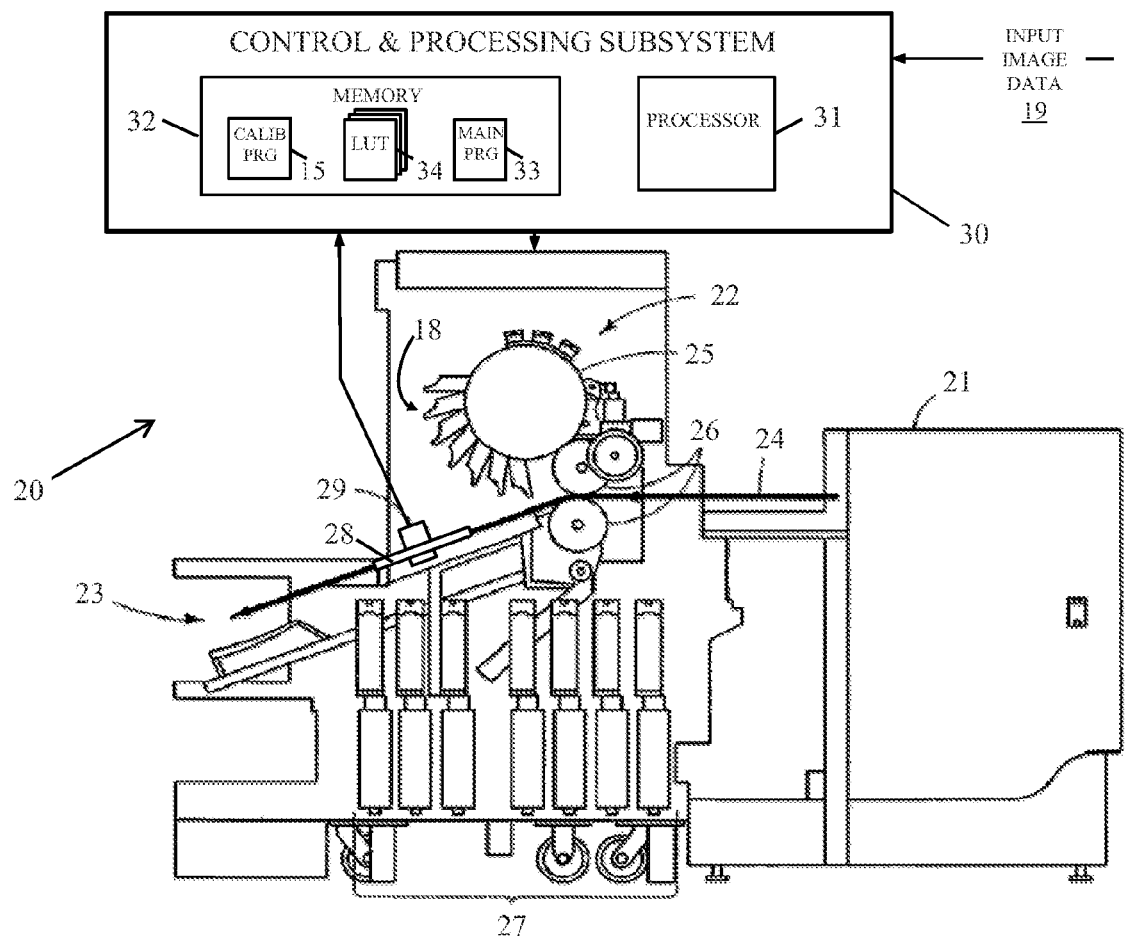
FIG. 2 is a diagram of a color printing system embodying the present invention.

Turning now to a consideration of FIG. 2, this Figure depicts an example color printing system 20 embodying the invention, the system being arranged to receive input image data 19 and print one or more corresponding hard color images (herein also called printed images or prints) upon media such as paper, labels, transparencies, etc. For example, the color printing system 20 may be a digital press, such as an HP Indigo 5000 digital printing press available from Hewlett-Packard Company.

The color printing system 20 includes a media feed unit 21, a print engine 22, and an output handling unit 23. In operation, media is transferred along a path 24 from the media feed unit 21 to the print engine 22 for the formation of hard images and subsequently outputted to the output handling unit 23.

The color printing system 10 further includes a control and processing subsystem 30 and a sensor subsystem 29. The control and processing subsystem 30 is arranged to receive and process the input image data 19 to generate control signals for feeding to the print engine 22 to cause it to print a corresponding hard image.

In the depicted embodiment, the print engine 22 is configured to implement electro-photographic imaging operations to form latent images in responsive to the control signals fed to it from the control and processing subsystem 30, and to develop the latent images using marking agents of a plurality of different colors—in the present example printing system, four inks, cyan, magenta, yellow and black are used as marking agents. More particularly, the print engine 22 uses a photoconductive drum 25 to successively form a latent image for each color to be printed. Each latent image is then developed through the application of a thin layer of the appropriate ink to the drum 25 using a corresponding developer unit 18. Each developed color image is transferred via imaging drums 26 to media within the media path 20 (a single media sheet 28 is shown in FIG. 2, opposite the sensor subsystem 29). The imaging drum 26 adjacent to the photoconductive drum 25 may be referred to as a blanket drum while the imaging drum 26 adjacent to the media path 24 is usually referred to as an impression drum.

The described exemplary print engine 22 is arranged to receive the inks from a plurality of reservoirs 27 configured to store the inks of the different colors. It will be appreciated that marking agents other than liquid inks (for example, toners in non-liquid form) may be used in other embodiments. Other configurations of the print engine 22 are, of course, possible.

The control and processing subsystem 30 is typically in the form of a program controlled processor 31, and associated memory 32 comprising both volatile and non-volatile sections. The memory 32 stores a main operational program 33 for causing the processor 31 to control the general operation of the printing system 20 in conventional manner, including the processing of the input image data 19. This latter processing includes using LUTs 34 stored in the memory 32, one per ink, for converting requested ink coverage values derived from the input image data 19 to corresponding screen sizes; the processing may also include an initial color management stage applied to the input image data to derive appropriate ink coverage values. The memory 32 also holds a calibration program 15 for causing the processor 31 to implement the calibration methods to be described below on the basis of the output of the sensor subsystem 29 and including the updating of the LUTs 34. The memory 32 also serves as a temporary store for intermediate processing results. It will be appreciated that the control and processing subsystem 30 may take other forms such as dedicated hardware (for example an ASIC or suitable programmed field programmable array).

The sensor subsystem 29 is positioned downstream of the print engine 22 along media path 24 and is configured to monitor printed color images formed upon media 28 by the print engine 14 by taking multiple measures of the reflectance spectrum of the printed image at each of multiple locations. The sensor subsystem 29 is, for example, in the form of an inline optical densitometer provided with three filters. Optical densitometers are well known in the art and one suitable form of densitometer is described in U.S. Pat. No. 7,502,116 (Hewlett-Packard Development Company). In other embodiments, the sensor subsystem 29 may be positioned at other locations from that depicted and take a different form (such as an in-line RGB scanner) so long as it is capable of providing multiple measures that are projections of the reflectance spectrum of the printed image, at each of multiple locations.

The locations at which the sensor subsystem 29 takes its measures correspond to known locations in the image being printed; as a result, the requested ink coverage values for each measurement location are known. To allow for small potential inaccuracies in where the measures are taken, the input image data 19 is analysed for regions (which may be small) of substantially constant (even) color and the measurement locations are sited in such regions—any positioning inaccuracy in respect of a measurement location will therefore not affect the validity of the association between the requested ink coverages and the reflectance spectrum measures for that location.

LUT Calibration—General Approach

Although formally the color of mixed ink patches cannot be measured using a small set of non colorimetric measurements (such as provided by a densitometer), it has been found that a sufficient color characterization is possible when such measurements are combined with knowledge of the printing process such as is embodied in an appropriate spectral model.

The calibration methods now to be described do not seek to effect a precise evaluation of the content of each of the colors in a printed mixed-ink patch as was previously done to calibrate the LUTs 34; instead, LUT correction parameters are directly estimated by minimizing a cost function that compares measured densitometer readings with expected values derived from the requested ink coverages using a spectral model of the printing process.

Figure 3:
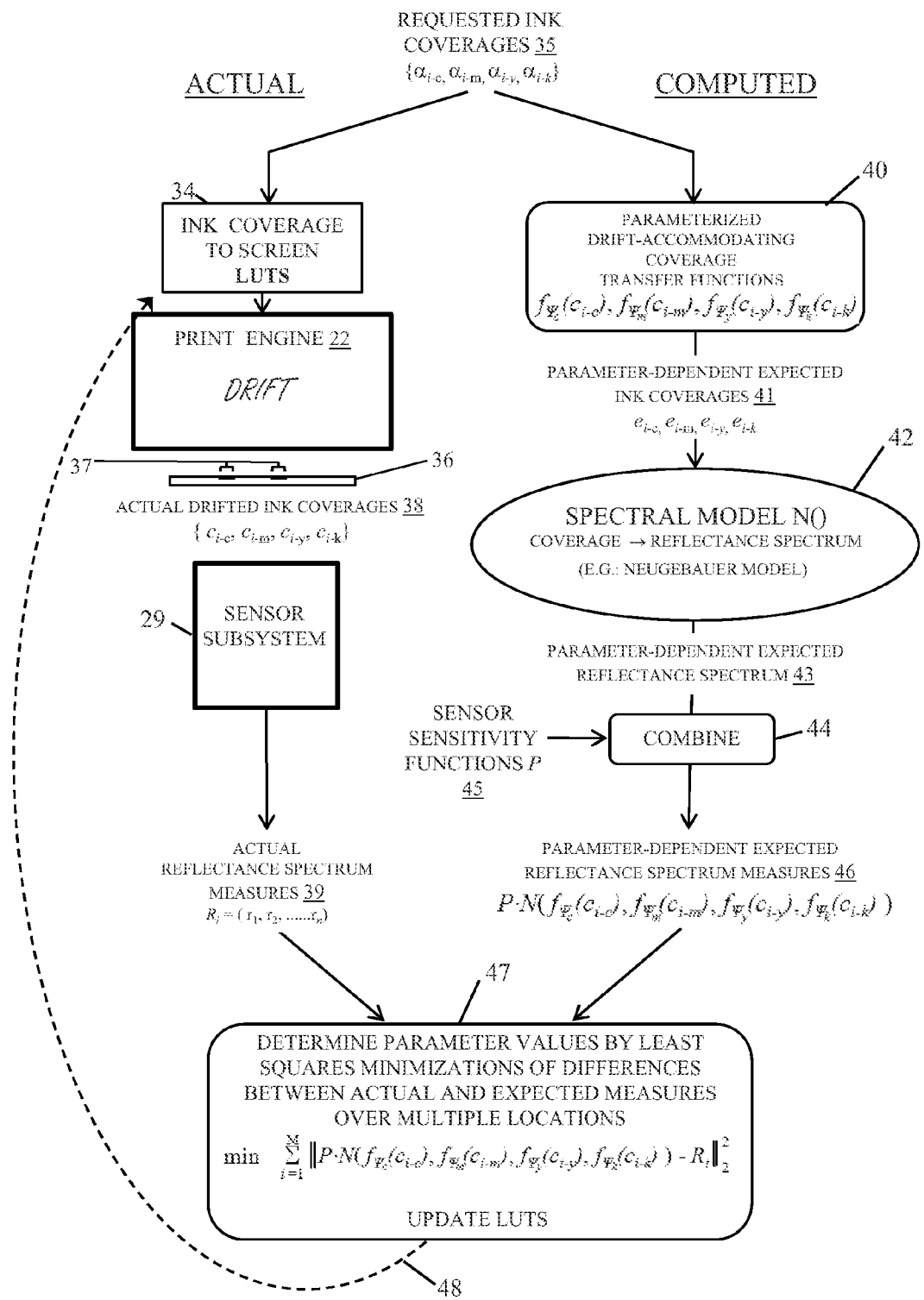
FIG. 3 is a diagram illustrating the basic operation of a LUT calibration method implemented by the FIG. 2 printing system.

The general approach used by calibration methods embodying the invention is illustrated in FIG. 3. It will be assumed that measurements are taken at M locations in an arbitrary printed image with the requested ink coverages 35 for the $i^{th}$ location ($1 \leq i \leq M$) being represented by the set:

$$\{\alpha_{i\text{-}c}, \alpha_{i\text{-}m}, \alpha_{i\text{-}y}, \alpha_{i\text{-}k}\}$$

where the suffix element i indicates the image location involved and the suffix letter c, y, m or k indicates the ink concerned (cyan, magenta, yellow or black respectively). The corresponding actual printed coverages 38 for the inks c, m, y, k are represented by the set:

$$\{c_{i\text{-}c}, c_{i\text{-}m}, c_{i\text{-}y}, c_{i\text{-}k}\}$$

with one ink coverage being generically designated $c_{i\text{-}ink}$. By way of example, M may have a value of 46 though this number can be substantially smaller or larger according to the degree of accuracy sought.

The left-hand side of FIG. 3 depicts the actual printing and measurement process. More particularly, the requested ink coverages 35 are converted, using the corresponding LUTs 34, into screen sizes which the print engine 22 uses to print a hard image 36. The possibility of drift in the print engine means that the actual printed ink coverages 38 may not correspond to the requested coverages 35. At each of M locations 37 in the printed image the sensor subsystem 29 takes a set $R_i$ of reflectance spectrum measures (again, the suffix i indicates the $i^{th}$ location). Each set $R_i$ comprises n measures r. In the present example, there are three measures in each set corresponding to the three filters with which the densitometer is provided, the measures being projections of the reflectance spectrum at the location concerned on the set of densitometer filters; a different number of measures can be taken. Overall, the sensor subsystem 29 provides M n-dimensional measurement vectors:

$$R_i=(r_1, r_2, \ldots r_n)(1 \leq i \leq M)$$

for each printed image.

The right-hand side of FIG. 3 depicts the computation of expected parameter-dependent measurement readings. For each of the M measurement locations, the corresponding requested ink coverages 35 ($c_{i-c}$, $c_{i-m}$, $c_{i-y}$, $c_{i-k}$) are converted into expected coverage values 41 ($e_{i-c}$, $e_{i-m}$, $e_{i-y}$, $e_{i-k}$) using respective parameterized conversion functions 40:

$$f_{\Psi_c}(c_{i-c}), f_{\Psi_m}(c_{i-m}), f_{\Psi_y}(c_{i-y}), f_{\Psi_k}(c_{i-k})$$

where the suffices $\Psi_c$, $\Psi_m$, $\Psi_y$ and $\Psi_k$ represent sets of one or more parameters parameterizing the conversion functions for the cyan, magenta, yellow and black inks respectively and whose values are to be determined to permit adjustment of the LUTs 34. The parameter-dependent expected ink coverages 41 are then used in a spectral model 42 appropriate to the printing process in order to derive a parameter-dependent expected reflectance spectrum 43 for the measurement location concerned (in practice, this reflectance spectrum will generally not be generated as a discrete result but be embedded in the overall computation being effected). The spectral model 42 may conveniently be represented as N(ink coverages). The computed expected reflectance spectrum 43 for each measurement location is then converted into a set of n parameter-dependent expected reflectance spectrum measures 46 using sensitivity functions 45 (in the present case, filter transfer functions) of the sensor subsystem 29 that are conveniently represented by column vector:

$$P=[P_1, P_2, \ldots P_n]^T$$

and the expected measures at each location as:

$$P \cdot N(f_{\Psi_c}(c_{i-c}), f_{\Psi_m}(c_{i-m}), f_{\Psi_y}(c_{i-y}), f_{\Psi_k}(c_{i-k}))$$

The values of the parameters making up the parameter sets $\Psi_c$, $\Psi_m$, $\Psi_y$ and $\Psi_k$ are then determined (box 47) by solving a minimization (typically, but not limited to, a least square minimization) of the cost function formed by the differences between the actual and expected measures over the M measurement locations, that is:

$$\min \sum_{i=1}^{M} \left\| P \cdot N\left(f_{\Psi_c}(c_{i-c}), f_{\Psi_m}(c_{i-m}), f_{\Psi_y}(c_{i-y}), f_{\Psi_k}(c_{i-k})\right) - R_i \right\|_2^2 \quad (1)$$

This may require separate derivation of a solution for each parameter set $\Psi_c$, $\Psi_m$, $\Psi_y$ and $\Psi_k$, or a single solution may suffice for all (for example, where there is only a single unknown parameter in each parameter set as may be the case where the coverage conversion functions used have a generic form based on particular drift models—see below). Finally, the determined parameter values are used to update the LUTs 34 (dashed arrow 48).

Various aspects of the computation of the expected reflectance spectrum measures will next be described followed by a more detailed consideration of minimization of the cost function of formula (1). Thereafter, a description is given of the overall calibration method implemented by the printing system 20.

The Parameterized Coverage Conversion Function 40

Two example forms of the parameter-dependent coverage conversion functions 40 are described below, it being appreciated that other forms are possible based, for example, on different assumptions regarding the form of the drift to that used in the first example below.

First Example Form

Quadratic Conversion Function

The effect of small drifts can be well approximated by a quadratic curve over the initial LUTs. Assuming that the LUTs 34 match zero coverage to a zero screen and full coverage to a screen giving 100% coverage, then for each ink, the skew introduced by drift can be modelled as:

$$f_q(x)=(1-q)x+qx^2 \quad (2)$$

where x represents non-drifted coverage values, $f_q(x)$ represents drifted coverage values, and q is a scalar parameter that describes the skew function of the ink. To ensure that $f_q(x)$ is monotonically increasing, the values of q are clipped to the range [−1 . . . 1].

The function $f_q(x)$ can be used as a coverage conversion function for converting a requested ink coverage to a drift-accommodating parameterized expected ink coverage; the parameter set $\Psi$ that characterises the function comprises the single parameter q.

Each of the four inks c, y, m, k has a respective coverage conversion function of the above form $f_q(x)$, the characterising parameter of each function being identified below by an appropriate suffix, thus: $q_c$, $q_m$, $q_y$, $q_k$ (these parameters are also collectively or generically, as indicated by context, represented below by q).

Second Example Form

Unconstrained Conversion Function

It is possible to derive a coverage conversion function without any prior assumptions about the actual drift. This can be achieved by defining the function using a plurality of parameters unbound by any predetermined constraining relationship between them whereby the parameters can take on any value minimising the aggregate differences between the sensed and expected reflectance-spectrum measures. A coverage conversion function of this form is referred to herein as an 'unconstrained' conversion function.

As previously noted, a standard method of LUT calibration for a given ink is to measure the actual coverage achieved when printing patches, using only that ink, for fifteen different screen sizes. Accordingly, a LUT transfer function for a given ink can be parameterized by a set $l_{ink}$ of fifteen parameters; this parameterised LUT transfer function, in its forward direction (coverage to screen size), is designated $L_{ink}( )$. By finding appropriate values for the parameters of the set $l_{ink}$, a forward LUT transfer function can be arrived at which accommodates the drift that has occurred and correctly converts a requested ink coverage to the screen size appropriate to cause the requested coverage to be printed.

If the forward transfer function of the existing LUT for a given ink is represented by $L_{ink}( )$, then the resultant screen size $s_{i-ink}$ for a requested coverage $c_{i-ink}$ of that ink for the $i^{th}$ patch will be:

$$s_{i-ink}=L_{ink}(c_{i-ink})$$

By using the parameterised LUT transfer function $L_{ink}( )$ in reverse, represented as $L_{ink}^{-1}( )$, a current screen size (which produces the current actual ink coverage) can be converted to a coverage value which for appropriate values of the parameters can be expected to be the actual coverage value. In other words:

$$L_{ink}^{-1}(L_{ink}(c_{i-ink})) \text{ or } L_{ink}^{-1}(s_{i-ink})$$

provides a coverage conversion function, parameterised by the set $l_{ink}$ of fifteen parameters, which converts a requested coverage value for the ink concerned into a parameter-dependent expected coverage value. The parameter set $l_{ink}$ corresponds to the parameter set Ψ associated with the coverage conversion function.

Of course, each of the four inks c, y, m, k, has its own LUT leading to four parameter sets $l_c$, $l_m$, $l_y$, $l_k$ each of fifteen parameters. In this case, minimization of differences between the actual and expected measures (box 47 FIG. 3) has to be solved for parameter set.

The Spectral Model 42

The spectral model chosen will depend on the printing process involved. In the present case for the example of an HP Indigo digital press, an appropriate spectral model is a four-ink version of the well known Neugebauer Model or the cellular Neugebauer Model. Other spectral models will be suitable for different cases as will be understood by persons skilled in the art.

The Neugebauer model works with a set of "primaries" composed of the set of all combinations of the inks being used. Thus, in the present case, the set D of Neugebauer primaries d is the set of all combinations of the four inks c, m, y, k:

$$\{\{\ \},\{c\},\{m\},\{y\},\{k\},\{cm\},\{cy\},\{ck\},\{my\},\{mk\},$$
$$\{yk\},\{cmy\},\{cyk\},\{myk\},\{cmk\},\{cmyk\}\}$$

Also used is the set $P_\lambda$ of reflectance spectra $P_d$ for the primaries d when printing full coverages of the inks concerned:

$$P_w, P_c, P_m, P_y, P_k, P_{cm}, P_{cy}, P_{ck}, P_{my}, P_{mk}, P_{yk}, P_{cmy}, P_{cyk},$$
$$P_{cmk}, P_{myk}, P_{cmyk}$$

These reflectance spectra can be measured on a once off basis using a spectrometer for the combination of inks and media concerned.

In words, the Neugebauer model can be expressed as:

Reflectance Spectrum N at a printed location=sum of weighted reflectance spectra $P_d$ of all primaries d where the weighting of each reflectance spectrum $P_d$ is a coverage value $a_d$ derived from the actual printed ink coverages. Thus:

$$N = \Sigma a_d P_d \text{ for all } d \text{ in } D$$

In the present context with M locations of interest per printed image, let the set $A_i$ of coverages $a_{i-d}$ of primaries d∈D for the $i^{th}$ location be:

$$\{a_{\{\ \}}, a_{i-c}, a_{i-m}, a_{i-y}, a_{i-k}, a_{i-cm}, a_{i-cy}, a_{i-ck}, a_{i-my}, a_{i-mk}, a_{i-yk},$$
$$a_{i-cmy}, a_{i-cmk}, a_{i-cyk}, a_{i-myk}, a_{i-cmyk}\}$$

Then, for $i^{th}$ location, the reflectance spectrum $N_i$ for set $A_i$ of primary coverages is:

$$N_i = \Sigma a_{i-d} P_d \text{ for all } d \text{ in } D \quad (3)$$

The coverage $a_{i-d}$ of a primary d in the $i^{th}$ location is normally derived from the actual printed ink coverages $c_{i-ink}$ for that location as:

$$\text{Element } a_{i-d} \text{ in } A_i = \prod_{ink \in \{c,m,y,k\}} \begin{cases} c_{i-ink} & ink \in d \\ (1 - c_{i-ink}) & ink \notin d \end{cases}$$

This can be put into matrix form as:

$$A_i = B x_i$$

(4)

where:
$A_i$ is a column vector of coverages $a_{i-d}$
B is a 16×16 matrix with elements of 0, 1, −1
$x_i$ is an "actual coverage products" column vector for $i^{th}$ location.

$A_i$, B and $x_i$ are shown in full in FIG. 4.

By way of example, the coverage $a_{i-cyk}$ for d={cyk} primary of $i^{th}$ location:

$$a_{i-cyk} = c_{i-c} \times (1 - c_{i-m}) \times c_{i-y} \times c_{i-k} = c_{i-c} c_{i-y} c_{i-k} - c_{i-c} c_{i-m} c_{i-y} c_{i-k}$$

is given by fourteenth row of B multiplied by $x_i$, that is:

1×(fourteenth row of $x_i$)−1×(sixteenth row of $x_i$)

On the basis of equation (4) and representing the set $P_\lambda$ of reflectance spectra $P_d$ for primaries d by the corresponding vector $P_\lambda$, equation (3) can be re-written as:

$$N_i = P_\lambda B x_i \quad (5)$$

In the present context in which the Neugebauer spectral model is being used to determine the expected reflectance spectrum measures at an $i^{th}$ location on the basis of parameter-dependent expected coverages values, the primary coverages $A_i$ are derived from the parameter-dependent expected coverage values rather than from the actual coverage values.

Thus, in the case of the above-described quadratic coverage conversion functions of the form $f_q(x)$ (see equation (2) above) being used to derive the parameter-dependent expected coverage values from the requested coverage values $\alpha_{i-c}$, $\alpha_{i-m}$, $\alpha_{i-y}$, $\alpha_{i-k}$, the "actual coverage products" column vector $x_i$ for $i^{th}$ location is replaced by an "expected coverage products" column vector $x_i'$ whose elements are all combinations of the expected ink coverages $e_{i-c}$, $e_{i-m}$, $e_{i-y}$, $e_{i-k}$ and which is derived as:

$$x_i' = V_i Q \quad (6)$$

where: $V_i$ is a 16×16 matrix of values based on the requested ink coverages $\alpha_{i-ink}$ for the $i^{th}$ location, and Q is a "parameter products" column vector whose elements are all combinations of the parameters $q_c$, $q_m$, $q_y$, $q_k$ characterizing the quadratic coverage conversion functions.

Q and $x_i'$ are shown in full in FIG. 5.

Regarding the matrix the rows of $V_i$, the rows of $V_i$ can be determined in terms of elements of Q by using the quadratic coverage conversion functions that provide the expected coverage values from the requested values, thus:

$$e_{i-c} = (1 - q_c)\alpha_{i-c} + q_c(\alpha_{i-c})^2 = \alpha_{i-c} - q_c(\alpha_{i-c} - (\alpha_{i-c})^2) = \alpha_{i-c} - q_c \beta_{i-c}$$

where: $\beta_{i-c} = (\alpha_{i-c} - (\alpha_{i-c})^2)$ $$e_{i-m} = (1 - q_m)\alpha_{i-m} + q_m(\alpha_{i-m})^2 = \alpha_{i-m} - q_c(\alpha_{i-m} - (\alpha_{i-m})^2) = \alpha_{i-m} - q_m \beta_{i-m}$$

where: $\beta_{i-m} = (\alpha_{i-m} - (\alpha_{i-m})^2)$ $$e_{i-y} = (1 - q_y)\alpha_{i-y} + q_y(\alpha_{i-y})^2 = \alpha_{i-y} - q_y(\alpha_{i-y} - (\alpha_{i-y})^2) = \alpha_{i-y} - q_y \beta_{i-y}$$

where: $\beta_{i-y} = (\alpha_{i-y} - (\alpha_{i-y})^2)$ $$e_{i-k} = (1 - q_k)\alpha_{i-k} + q_k(\alpha_{i-k})^2 = \alpha_{i-k} - q_k(\alpha_{i-k} - (\alpha_{i-k})^2) = \alpha_{i-k} - q_k \beta_{i-k}$$

where $\beta_{i-k} = (\alpha_{i-k} - (\alpha_{i-k})^2)$

By way of example, FIG. 5 shows the elements of the fourteenth row of $V_i$, corresponding to the $e_{i-c} e_{i-y} e_{i-k}$ element of $x_i'$ (omitting "i-" in suffixes for simplicity).

Where the above-described unconstrained coverage conversion functions of the form $L_{ink}^{-1}(L_{ink}(c_{i-ink}))$ are used to derive the parameter-dependent expected coverage values from the requested coverage values $\alpha_{i-c}$, $\alpha_{i-m}$, $\alpha_{i-y}$, $\alpha_{i-k}$, the expected ink coverages $e_{i-c}$, $e_{i-m}$, $e_{i-y}$, $e_{i-k}$ that are used to determine the elements of the "expected coverage products"

column vector $x_i'$ (which replaces $x_i$), are derived at each iteration using the conversion functions rather than through the use of pre-derived matrixes corresponding to $V_i$ and Q as was done in the case of the quadratic coverage conversion function.

Cost Function Minimisation (Box 47)

The generalised form of the cost function to be minimized was given in formula (1) above as:

$$\min \sum_{i=1}^{M} \left\| P \cdot N(f_{\Psi_c}(c_{i-c}), f_{\Psi_m}(c_{i-m}), f_{\Psi_y}(c_{i-y}), f_{\Psi_k}(c_{i-k})) - R_i \right\|_2^2$$

This can be expressed more specifically depending on the form of coverage conversion function being used.

Thus where the quadratic coverage conversion function $f_q(x)$ is employed reducing the parameter sets $\Psi_c, \Psi_m, \Psi_y$ and $\Psi_k$ to the single parameters $q_c, q_m, q_y, q_k$, the function to be solved to determine values for $q_c, q_m, q_y, q_k$ can be written as:

$$q_c q_m q_y q_k = \underset{q_c q_m q_y q_k}{\operatorname{argmin}} \sum_{i=1}^{M} \left\| P \cdot N(f_{q_c}(c_{i-c}), f_{q_m}(c_{i-m}), f_{q_y}(c_{i-y}), f_{q_k}(c_{i-k})) - R_i \right\|_2^2 \quad (7)$$

which, on the basis of equations (5) and (6) (with $x_i'$ from equation (6) replacing $x_i$ as discussed), can be re-written as:

$$q_c q_m q_y q_k = \underset{q_c q_m q_y q_k}{\operatorname{argmin}} \sum_{i=1}^{M} \left\| P \cdot P_\lambda B V_i Q(q_c, q_m, q_y, q_k) - R_i \right\|_2^2 \quad (8)$$

This can be solved using a 'gradient descend' algorithm in standard manner. The overall approach to deriving parameter values for LUT updating, that is based on the quadratic coverage conversion function and minimizing the cost function of equation (8) is referred to below as the 'quadratic approach'.

The 'quadratic approach' to updating the LUTs has the advantage that only four parameters are required to be evaluated—one free parameter q for each ink. However, the quadratic skew assumption, on which this approach is based, is an approximation and might not always hold. It can be mathematically shown that when the quadratic skew assumption holds, and under the ideal conditions of zero noise and the printing process being well described by the Neugebauer model, the above cost function will converge. However, the convergence may be to a local minimum. In such a case, the unconstrained coverage conversion function may provide a better solution.

Where use is made of the unconstrained conversion function $L_{ink}^{-1}(L_{ink}(c_{i-ink}))$, also written as $L_{ink}^{-1}(s_{i-ink})$, the generalised form of the cost function to be minimized can be expressed as:

$$l_{ink} = \quad (9)$$

$$\underset{l_{ink}}{\operatorname{argmin}} \sum_{i=1}^{M} \left\| P \cdot N(\mathcal{L}_c^{-1}(s_{i-c}), \mathcal{L}_m^{-1}(s_{i-m}), \mathcal{L}_y^{-1}(s_{i-y}), \mathcal{L}_k^{-1}(s_{i-k})) - R_i \right\|_2^2$$

where $l_{ink}$ is the set of fifteen parameters parameterizing the LUT transfer function $L_{ink}(\,)$ for one of the inks c, y, m, k. Using equation (5) but with $x_i$ replaced by the vector of expected coverages $x_i'$ (here represented as a function of the outputs of the unconstrained conversion functions), equation (9) can be rewritten as:

$$l_{ink} = \underset{l_{ink}}{\operatorname{argmin}} \sum_{i=1}^{M} \quad (10)$$

$$\left\| P \cdot P_\lambda B x_i'(\mathcal{L}_c^{-1}(s_{i-c}), \mathcal{L}_m^{-1}(s_{i-m}), \mathcal{L}_y^{-1}(s_{i-y}), \mathcal{L}_k^{-1}(s_{i-k})) - R_i \right\|_2^2$$

This cost function is solved for each parameter set $l_c, l_m, l_y, l_k$ in turn. The overall approach to deriving parameter values for LUT updating, that is based on the unconstrained coverage conversion function and minimizing the cost function of equation (10) is referred to below as the 'unconstrained approach'.

Effectively, the 'unconstrained approach' searches for the best LUT values that explain the measurements without making any prior assumptions about the actual drift. Although this approach might appear to be better than the 'quadratic approach', this is not always true. This is because the measured locations in the arbitrary printed image being used for LUT calibration, encompass only a portion of the coverage values possible for each ink; since the 'unconstrained approach' allows any LUT values, as long as they are monotonic, it relies on the existence of data about coverages similar to the point of interest and such data will only exist if a measured location has such a coverage. For this reason, in one embodiment of the LUT calibration method, the 'quadratic approach' is used most of the time during the running of a print job with the 'unconstrained approach' being used occasionally during the run in order to fix any non-quadratic elements of the drift.

Overall LUT Calibration Process

Figure 6:
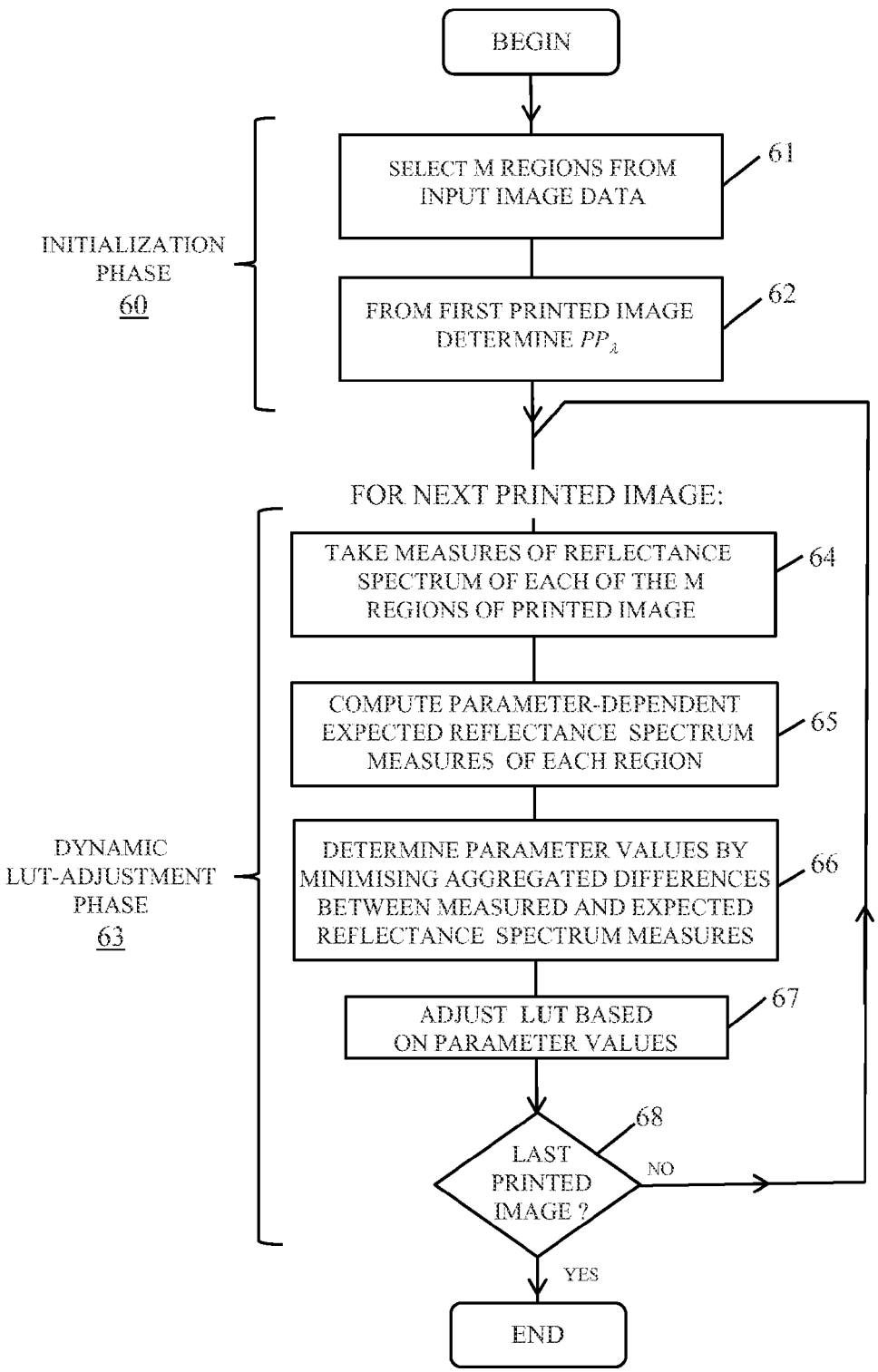
FIG. 6 is an overall flow chart of one form of the LUT calibration method implemented by the FIG. 2 printing system.

FIG. 6 shows an overall flow chart of one form of the LUT calibration method as implemented by the FIG. 2 printing system 20 under the control of the program 15 to effect on-going LUT adjustment in the course of a print run printing multiple copies of an arbitrary customer print job. It is assumed that at the start the coverage-to-screen size relationships stored by the LUTs 34 for each ink are satisfactory.

The calibration method comprises two phases, namely an initialization phase 60 and a dynamic LUT-adjustment phase 63.

In the initialization phase 60, the M regions of the image to be used for taking reflectance measures are determined (step 61). As already described, this determination is done using the input image data 19, suitable regions corresponding to areas of substantially constant color.

The initialization phase 60 includes a second step 62 in which the value of the multiplication $P \cdot P_\lambda$ (which appears in both the 'quadratic approach' cost function of equation (8) and the 'unconstrained approach' cost function of equation (10)) is adjusted on the basis of measurements taken from the first printed image, referred to as the 'proof' print. This is done in order to deal both with possible inaccuracies in the sensitivity function data P for the sensor subsystem 29 (usually supplied by the sensor manufacturer), and with inaccurate spectral model parameters. To determine an adjusted value for $P \cdot P_\lambda$, the 'quadratic approach' cost function of equation (8) is used but now an assumption of no drift is made (the proof print being the first print) so all the parameters $q_c, q_m, q_y, q_k$ have a value of zero; the cost function minimization is then solved for $P \cdot P_\lambda$ rather than for the values of q. These computed values for $P \cdot P_\lambda$ are then used in the LUT adjustment computations that follow in phase 63. Of course, step 62 could alternatively be carried out based on adapting the 'unconstrained approach' cost function.

During the dynamic LUT-adjustment phase 63, LUT adjustments are computed from each successive print by minimizing the differences between sensed and expected reflectance spectra measures using either the quadratic or unconstrained approach.

More particularly, in step 64 the sensor subsystem 29 is used to take reflectance spectrum measures from the current print of interest at each of M locations of the print corresponding to the M regions selected in step 61. The expected values of these sensed measures are computed in step 65 using either the quadratic or unconstrained parameterized coverage conversion function. Steps 64 and 65 can be carried out in any order or in overlap.

Next, in step 66, the values of the parameters that parameterize the coverage conversion function used in step 65 are determined by minimizing the aggregated differences between the sensed and expected reflectance measures in accordance with equation (8) or (10). Using these parameter values, the LUTs 34, one for each ink, are modified (step 67).

Unless the print just measured was the last print of the print run (tested in step 68), processing continues by repeating steps 64 to 67 for the next print and this process continues until the last print has been processed.

The 'quadratic' and 'unconstrained' approaches may be mixed in the same print run; thus, as already noted, the 'quadratic approach' may used most of the time and the 'unconstrained approach' used occasionally in order to fix any non-quadratic elements of the drift.

It will be appreciated that the more data there is, the more accurate the minimization process will be. Accordingly, rather than effecting the minimization computation of step 66 over aggregated differences between sensed and expected spectral measures derived for a single print, the computation can be based on data collected from several successive prints. Typically, the effects of drift are gradual so that data taken from successive prints is likely to give rise to the same adjustment parameters. One way of extending the minimization computation over several successive prints is simply to collect all the sensed measures taken from these prints and treat them as if they were all from a single print; this is equivalent to averaging the measures in order to reduce measurement noise. Of course, computation of the expected measures need only be done once for the same measurement location across the prints being averaged.

A more sophisticated approach is to update the LUTs after each print as in FIG. 6, and then effect a supplementary update of the LUTs after each group of j prints, this supplementary update taking into account all the measurements made in respect of the prints in the group. These measurements will, of course, have been taken with different applied LUTs; in order to combine then, it is accordingly necessary to first transform all measurements to the same LUTs (typically the LUTs in their states used with the first print of the current group). This is done by changing the values of the requested ink coverages. By way of example, let $L_{c1}()$ be the transfer function of the cyan LUT used with the first print of the group, and let z be the requested cyan coverage in one location, so that the digital screen used for that location in the first print of the group is $L_{c1}(z)$. Also, let $L_{c2}()$ be the updated LUT after steps 64-67 are carried out based on the first print of the group, so that $L_{c2}(z)$ is the new (possibly different) digital screen that is used for the second print of the group. When accumulating the data for computing the supplementary update to be effected at the end of the current group of prints, the requested cyan coverage for the second print is taken as $L_{c1}^{-1}(L_{c2}(z))$.

Implementations of the described LUT calibration methods have been found to result in updated LUTs with maximal errors (compared to a correct LUT) of two or less coverage percentages which compares well with state-of-the-art calibration methods. Although, as noted, the calibration methods described can be carried out using arbitrary printed images, this does not mean that all images will produce the same calibration accuracy and it is to be expected that some printed images will not be as useful as others in enabling calibration.

It will be appreciated that many variations are possible to the above described form of LUT calibration methods and apparatus. For example, although in the embodiment described above, the assumed in-line sensor subsystem is an in-line densitometer with three filters, a different, number of filters (and therefore measures) can be used or a different type of in-line measurement device, such as a scanner, can be employed.

Furthermore, the described LUT calibration methods are not limited to in-line use in a printing system; for example, the calibration methods can be used for hard copy imitation, that is, for setting up a printing system to print images that reproduce the spectral character of a hard-copy image previously printed on a possibly unknown printer but for which the corresponding original image data is available. In this case, even-color regions on the hard-copy image are measured off-line and the corresponding requested coverage values derived from the original data. The measurements taken from the hard-copy image are then used as sensed measures in effecting several iterations of LUT updating (steps 65-67) on the printing system being set up for the new print run of the image; after sufficient iterations the measures produced by the sensor subsystem of the printing system being set up should accurately imitate those measured on the hard-copy image.

As already indicated, other forms of parameter-dependent coverage conversion functions are possible besides the quadratic and unconstrained forms described above. In particular, parameter-dependent coverage conversion functions can be implemented that are based on different assumptions regarding the form of the drift to that used in the quadratic conversion function; such coverage conversion functions can generally be used in the same manner as the quadratic conversion function in LUT calibration.

Although the described calibration methods have been elaborated principally in the context of LUT adjustment, the same methods can also be applied to the calibration of other printing-system components as has already been shown in connection with the initialization step 62 of FIG. 6 LUT adjustment flow chart. It will be recalled that in step 62, an adjusted value for $P \cdot P_\lambda$ was determined using an application of equation (8) for which the quadratic coverage conversion parameters $q_c$, $q_m$, $q_y$, $q_k$ were taken to be zero, and the cost function of equation (8) then minimized for $P \cdot P_\lambda$. This effectively amounts to the calibration of the printing-system component subsystem comprising the sensors 29 (characterized by P), and the ink-media combination (characterized by $P_\lambda$). Of course, one or other of P and $P_\lambda$ could be treated as fixed at its previous value so that calibration is limited to the other—for example, with $P_\lambda$ fixed, the calibration is for the sensitivity functions P of the sensors 29.

Other printing-system components that can be calibrated in this way include the developer units 18. Each of these units uses an applied developer voltage to control the amount of ink being transferred to the drum 25 and this voltage needs to be set (calibrated) separately for each developer unit to ensure that 100% requested coverage of the corresponding ink results in full actual coverage without over-inking leading to ink layer build up. By introducing into the cost function a parameter for each ink that models the effect of changing the corresponding developer voltage, it becomes possible to solve the cost function minimization for these parameters and derive appropriate adjustments of the developer voltages. Both the 'quadratic approach' and the 'unconstrained approach' can be used for this purpose.

For the 'quadratic approach', the developer voltage is modelled as a scaling factor parameter in the drift model, so instead of the drift skew curve being modeled as a second order polynomial, the skew curve is modeled by a second order polynomial multiplied by a parameter d. There are thus four additional parameters $d_c$, $d_m$, $d_y$, $d_k$ (one for each ink) to be evaluated, as well as the four parameters $q_c$, $q_m$, $q_y$, $q_k$. Thus if:

$$d=(d_c, d_m, d_y, d_k)$$

the previous quadratic coverage conversion equation (corresponding to equation (2) above) becomes:

$$f_{q,d}(x)=d\cdot[(1-q)x+qx]^2$$

with x representing the requested coverage values, and $f_{q,d}(x)$ representing expected coverage values. The cost function formula (1) now becomes:

$$\min_{q_c q_m q_y q_k d_c d_m d_y d_k} \sum_{i=1}^{M} \left\| P \cdot N\left(f_{q_c d_c}(c_{i-c}), f_{q_m d_m}(c_{i-m}), f_{q_y d_y}(c_{i-y}), f_{q_k d_k}(c_{i-k})\right) - R_i \right\|_2^2 \quad (11)$$

which is then minimised for the parameters q and d in turn on an iterative basis (that is, when minimizing for q, the values for d are fixed, and values for q derived; minimization for d is then carried out, with q fixed at its new values, to derive new values for d—and so on iteratively, minimizing for q assuming d is fixed, and minimizing d assuming q is fixed, until convergence. The resulting values for q and d are then used for calibrating the LUTs and the developer voltages respectively.

For the 'unconstrained approach', the transfer function of each LUT is now described by a set link not of 15 parameters, but of 16 parameters—the extra parameter is a multiplicative factor, multiplying all 15 coverage values, that is related to the developer voltage. Therefore this solution is similar to the one above, here involving solving the cost function iteratively for the 15 LUT parameters (assuming a fixed developer-voltage parameter), and then solving for the developer-voltage parameter (assuming fixed LUT parameters).

The foregoing process for determining an appropriate developer voltage, involves g an approximation in how reflection is modelled. Light passing through the printed ink layer decays exponentially with layer thickness. Hence, the reflection should be modelled by:

$$R_i(c)=c^{-h}$$

where c is the coverage value and h is the thickness of the layer. However, in the above process for determining developer voltage, In the solution described above, $R_i(c)$ is approximated by:

$$R_i(c)=d\cdot c$$

which results in a solution that is good enough to determine the direction of the change in the developer voltage value. Another approach would be to approximate the exponential curve directly and estimate h, however, this would require estimation of the exact coverage.

Of course, if the LUT drift can be assumed to be zero (such as at the start of a print run) so that only the appropriate developer voltages need to be determined, cost function minimization is greatly simplified.

It will be appreciated that the number, color and form of the marking agents used in printing systems to which the above-described calibration methods can be applied, can be varied from those given above for the example printing system 20. The phrase "multiple reflectance spectrum measures" implies that one or more portions of the spectrum are being measured, not necessarily the full spectrum. In other words, multiple measures based on the reflectance spectrum or multiple measures that relate to the reflectance spectrum are taken.

The invention claimed is:

1. A method of calibrating a component of a color printing system, the method comprising:
    measuring, by a sensing system, reflectance spectrum values at each of multiple locations of a hard-copy image;
    computing expected reflectance spectrum values for each said location based on a requested coverage value for each of marking agents printed at each said location, the computed expected reflectance spectrum values being dependent on at least one parameter modelling a characteristic of the component;
    aggregating differences between the measured and expected reflectance spectrum values across said locations;
    determining a value of said at least one parameter that minimizes the aggregate differences; and
    calibrating the component according to the determined value of said at least one parameter.

2. A method according to claim 1, wherein computing the expected reflectance spectrum values at a said location comprises:
    converting the requested coverage value for each marking agent at said location into an expected printed coverage value using a parameterized coverage conversion function for each marking agent, said at least one parameter comprising parameters that parameterize the coverage conversion function for each marking agent;
    processing the expected printed coverage values using a spectral model relating the expected printed coverage values to a corresponding reflectance spectrum; and
    generating the expected reflectance spectrum values as projections of response functions of the sensing system on an output of the spectral model, the computed expected reflectance spectrum values being dependent on the parameters parameterizing the coverage conversion functions.

3. A method according to claim 2, wherein the coverage conversion function for each marking agent comprises a plurality of parameters unbound by a predetermined constraining relationship between the plurality of parameters, whereby the plurality of parameters can take on any values minimizing the aggregate differences between the measured reflectance spectrum values and the expected reflectance_spectrum values.

4. A method according to claim 2, wherein each coverage conversion function comprises a parameter characterizing a predetermined general form of relationship between the requested coverage values and the expected printed coverage values.

5. A method according to claim 2, wherein the component of the color printing system comprises a stored relationship for each marking agent relating requested coverage values to printing-system settings intended to result in corresponding actual coverages in a printed image.

6. A method according to claim 5, wherein each stored relationship is in the form of a lookup table and the printing-system settings to which requested coverage values are converted are half-tone screen sizes.

7. A method according to claim 5, wherein the sensing system is an inline sensing subsystem of the color printing system, the hard-copy image from which the reflectance spectrum values are taken by the sensing system being an image printed by the color printing system, the method further comprising calibrating said stored relationships repeatedly on an on-going basis during the course of a printing run printing multiple copies of said hard-copy image.

8. A method according to claim 7, wherein the determining of the value of the at least one parameter is based on the measured and expected reflectance spectrum values accumulated for multiple successive images printed by the color printing system.

9. A method according to claim 7, further comprising determining a value of a printing-system spectral property used in computing said expected reflectance spectrum values, the determining including an initial iteration of the calibration process in which the value of the printing-system spectral property is treated as unknown and the requested coverage values are used as the expected coverage values thereby fixing the values of the coverage_conversion_function parameters, the determined value of the printing-system spectral property being the value that minimizes the aggregate differences between the sensed and expected reflectance spectrum values.

10. A method according to claim 7, wherein the coverage conversion function for each marking agent includes a further parameter modelling a full coverage value for each marking agent, the method further comprising determining the further parameter to calibrate a printing-system component controlling full coverage of each marking agent.

11. A method according to claim 5, wherein the hard-copy image is a printed image having a spectral character, wherein the method includes the color printing system printing images imitating the spectral character of the hard-copy image.

12. A method according to claim 1, wherein the sensing system comprises an optical densitometer with multiple filters.

13. A method of adjusting, for each of a plurality of different colored inks in a color printing system, a respective stored relationship relating requested ink coverage values to printing-system settings; the method comprising:
  taking multiple measurements of reflectance spectrum values at each of predetermined locations of an arbitrary image printed by the printing system;
  computing, for each said location, expected reflectance spectrum values in the form of expected reflectance spectrum projections based on:
    known requested ink coverages for the location;
    a parameterized drift-accommodating coverage conversion function for each ink color;
    a spectral model relating printed ink coverages to a corresponding reflectance spectrum; and
    a sensing-system response function,
  wherein the computed expected reflectance spectrum values are dependent on parameters parameterizing the drift-accommodating coverage conversion functions;
  determining values of said parameters to minimize aggregate differences between the sensed and expected reflectance spectrum values across said locations; and
  modifying the stored relationships based on the determined parameter values.

14. A color printing system comprising:
  a print engine to print color images using multiple inks of different colors;
  a sensing subsystem to measure reflectance spectrum values of a hard-copy image printed by the print engine; and
  a control and processing subsystem to calibrate a printing-system component of the color printing system, wherein to calibrate the printing-system component, the control and processing subsystem is to:
    cause the sensing subsystem to measure reflectance spectrum values at each of multiple locations of a hard-copy image printed by the print engine;
    compute expected reflectance spectrum values for each said location based on a requested coverage value for each of the inks printed at each said location, the computed expected reflectance spectrum values being dependent on at least one parameter modelling a characteristic of the component;
    aggregate differences between the measured and expected reflectance spectrum values across said locations;
    determine a value of said at least one parameter that minimizes the aggregate differences; and
    calibrate the component according to the determined value of said at least one parameter.

15. A printing system according to claim 14, wherein to compute the expected reflectance values at a said location, the control and processing subsystem is to:
  convert the requested coverage value for each of the inks printed at each of said location into an expected printed coverage value for each of the inks based on a parameterized coverage conversion function for each of the inks, said at least one parameter comprising parameters that parameterize the coverage conversion function for each of the inks;
  process the expected printed coverage value using a spectral model relating the expected printed coverage values to a corresponding reflectance spectrum; and
  generate the expected reflectance spectrum values as projections of response functions of the sensing system on an output of the spectral model;
  the computed expected reflectance spectrum values being dependent on the parameters parameterizing the coverage conversion functions.

16. A printing system according to claims 15, wherein the control and processing subsystem includes a memory to store a lookup table for each ink to relate requested ink coverage values to half-tone screen sizes, wherein the control and processing system is to calibrate the printing-system component based on the lookup tables.

* * * * *

UNITED STATES PATENT AND TRADEMARK OFFICE
CERTIFICATE OF CORRECTION

| | | |
|---|---|---|
| PATENT NO. | : 8,873,104 B2 | Page 1 of 1 |
| APPLICATION NO. | : 13/639050 | |
| DATED | : October 28, 2014 | |
| INVENTOR(S) | : Hila Nachlieli et al. | |

It is certified that error appears in the above-identified patent and that said Letters Patent is hereby corrected as shown below:

In the claims

In column 16, line 54, in Claim 16, delete "claims" and insert -- claim --, therefor.

Signed and Sealed this
Fourteenth Day of June, 2016

Michelle K. Lee
*Director of the United States Patent and Trademark Office*